(12) United States Patent
Mutz

(10) Patent No.: US 7,458,271 B2
(45) Date of Patent: Dec. 2, 2008

(54) FLUID SENSOR

(75) Inventor: Dieter Mutz, Heilbronn (DE)

(73) Assignee: Atmel Germany GmbH, Heilbronn (DE)

( * ) Notice: Subject to any disclaimer, the term of this patent is extended or adjusted under 35 U.S.C. 154(b) by 0 days.

(21) Appl. No.: 11/871,144

(22) Filed: Oct. 11, 2007

(65) Prior Publication Data

US 2008/0115584 A1 May 22, 2008

Related U.S. Application Data

(60) Provisional application No. 60/851,762, filed on Oct. 16, 2006.

(30) Foreign Application Priority Data

Oct. 11, 2006 (DE) .................. 10 2006 048 068

(51) Int. Cl.
*G01L 9/06* (2006.01)
(52) U.S. Cl. ...................... 73/727; 73/146.8
(58) Field of Classification Search ............. 73/727, 73/146.8

See application file for complete search history.

(56) References Cited

U.S. PATENT DOCUMENTS

| 4,734,674 A | 3/1988 | Thomas et al. |
| 5,661,244 A | 8/1997 | Nishimura et al. |
| 5,774,056 A * | 6/1998 | Berry et al. ............. 340/607 |
| 6,619,110 B1 | 9/2003 | Delaporte |
| 2001/0029786 A1 * | 10/2001 | Takakuwa et al. ......... 73/706 |

FOREIGN PATENT DOCUMENTS

DE 10154335 A1 5/2003

* cited by examiner

*Primary Examiner*—Andre J Allen
(74) *Attorney, Agent, or Firm*—Muncy, Geissler, Olds & Lowe, PLLC

(57) ABSTRACT

A fluid sensor is provided for determining a fluid characteristic, having an electronic sensor element that has an active surface for determining the fluid characteristic, having a mounting plate associated with the sensor element, and having a filter device associated with the sensor element for filtering the fluid, in which the active surface of the sensor element is oriented toward the mounting plate and in which the mounting plate is provided with an opening opposite from the active surface of the sensor element. According to an embodiment the invention, an end region of the filter device is accommodated in a sealed fashion in the opening of the mounting plate. Furthermore, the fluid sensor can be used for tire pressure measurement.

11 Claims, 2 Drawing Sheets

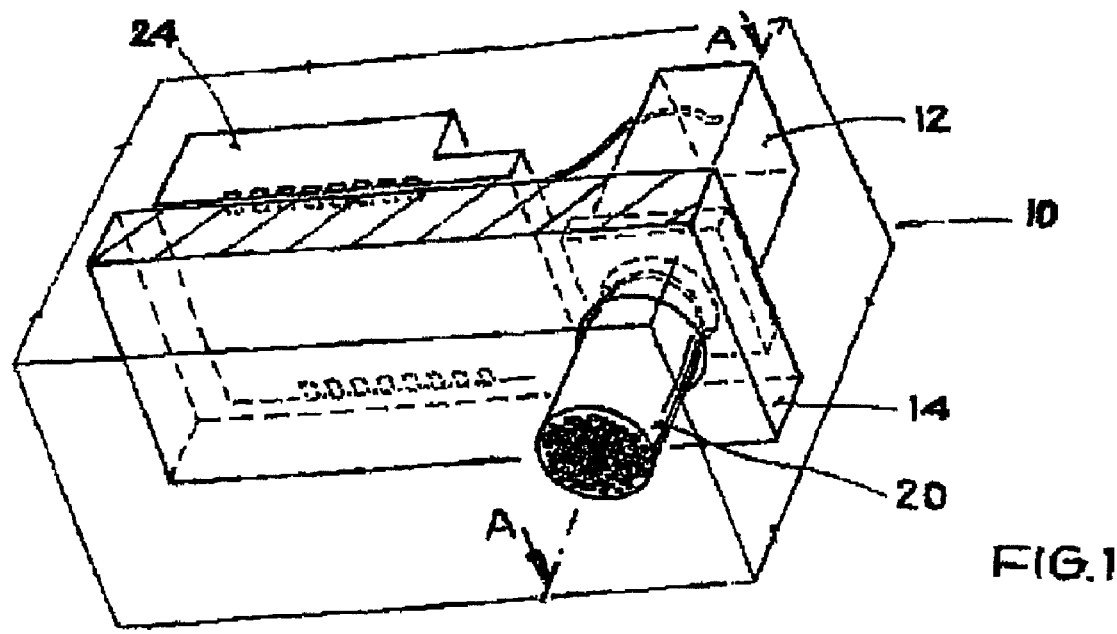
FIG. 1
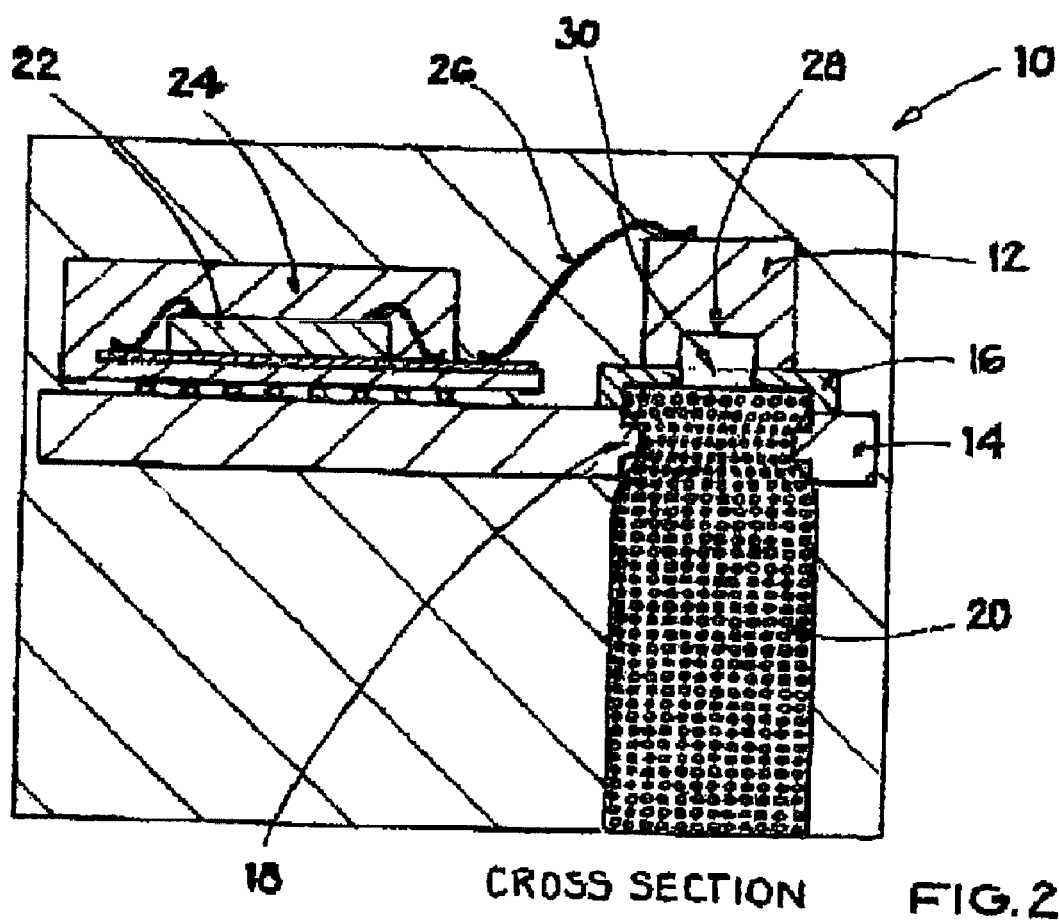
CROSS SECTION FIG. 2

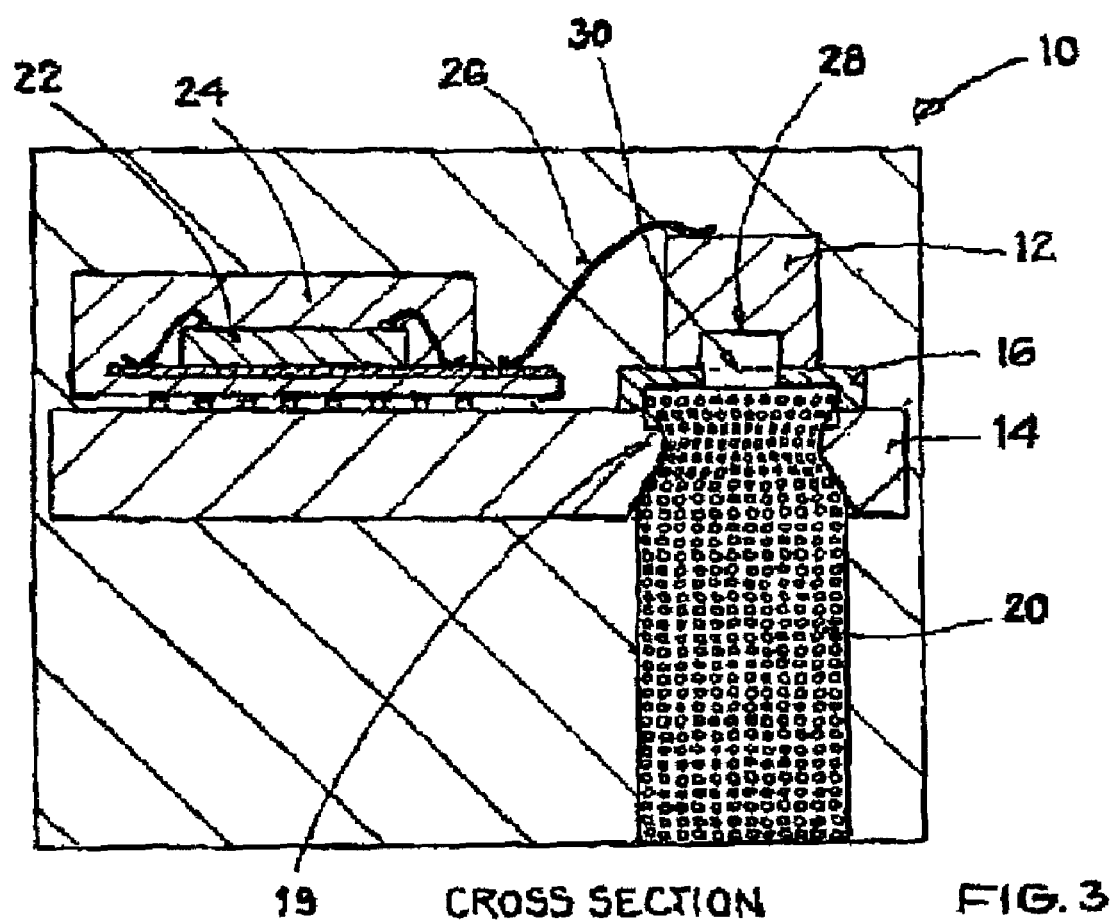
CROSS SECTION   FIG. 3

FLUID SENSOR

This nonprovisional application claims priority to German Patent Application No. DE 102006048068, which was filed in Germany on Oct. 11, 2006, and to U.S. Provisional Application No. 60/851,762, which was filed on Oct. 16, 2006, and which are both herein incorporated by reference.

BACKGROUND OF THE INVENTION

1. Field of the Invention

The present invention relates to a fluid sensor for determining a fluid characteristic, having an electronic sensor element that has an active surface for determining the fluid characteristic, having a mounting plate associated with the sensor element, and having a filter device associated with the sensor element for filtering the fluid, in which the active surface of the sensor element is oriented toward the mounting plate and in which the mounting plate is provided with an opening opposite from the active surface of the sensor element,

2. Description of the Background Art

A conventional fluid sensor is embodied in the form of a tire pressure sensor and is provided for mounting in a valve region of a motor vehicle tire. The conventional fluid sensor is equipped with an electronic sensor element that has an active surface embodied in the form of a pressure sensing membrane. The sensor element is attached to a mounting plate that is equipped with a separately manufactured, hollow cylindrical holder for the filter device. The hollow cylindrical holder is provided for a fluid-tight connection between the filter device and the sensor element. The function of the filter device is to keep foreign matter such as dirt particles that can be contained in the fluid, particularly in a gas or liquid, away from the active surface of the sensor element in order to prevent damage to the sensor element. To this end, the filter device is manufactured of a porous material, typically an open-pored polytetrafluoroethylene material. Concentric to the recess in the hollow cylindrical holder, an opening is provided in the mounting plate. Consequently, the sensor element can be attached to a side of the mounting plate oriented away from the hollow cylindrical holder and is communicatively connected to the filter device through the opening. In order to assure tightness, the hollow cylindrical holder is accommodated on the mounting plate in a sealed fashion. Several assembly steps are required to manufacture the fluid sensor, particularly including the joining of the hollow cylindrical holder to the mounting plate and the fitting of the filter device into the hollow cylindrical holder.

SUMMARY OF THE INVENTION

It is therefore an object of the present invention to provide a fluid sensor with a simpler and less expensive design.

The fluid sensor according to the invention features the fact that an end region of the filter device is accommodated in a sealed fashion in an opening of the mounting plate. This makes it possible to achieve a decisive simplification of the design of the fluid sensor. The mounting plate and filter device are matched to each other so that the filter device can be accommodated in a sealed fashion directly in the mounting plate. This makes it possible to eliminate an intermediate piece of the kind in the form of the hollow cylindrical holder that is required in the known fluid sensor. In addition to saving the cost of a component, this also makes it possible to eliminate both an attachment procedure and a specific embodiment of the mounting plate that requires strict tolerancing for the hollow cylindrical holder. According to the invention, the mounting plate opening, which is required anyway to assure a communicative connection between the filter device and the sensor element, is adapted to the filter device in such a way that the latter can be accommodated in the mounting plate in a sealed fashion.

According to one embodiment of the invention, the opening has a cross section that is smaller than a cross section at one end of the filter device. The filter device can have an arbitrary cross section, e.g. a round or rectangular one; the decisive factor is that due to the material selection and the porosity of the material (preferably porous polytetrafluoroethylene), the filter device has an advantageous elasticity so that it is elastically deformed in some areas during the joining process and is thus accommodated in a sealed fashion in the opening. Preferably, the filter device has a circular cross section so that it can be accommodated in an easy-to-produce, preferably likewise circular cross section of the opening. The opening assures a circumferential and uniform deformation of the preferably cylindrical filter device, thus making it possible to assure that requirements are met with regard to the tightness of the seal between the sensor element and filter device.

In another embodiment of the invention, the mounting plate is embodied in the form of a printed circuit board provided for coupling electrical signals into and/or out of the sensor element. The mounting plate therefore performs several functions. It serves as a dimensionally stable support for the filter device and the sensor element, it assures the sealed accommodation of the filter device, and it permits the transmission of signals to and from the sensor element. Preferably, copper-clad, glass fiber-reinforced synthetic resin boards, which are also referred to as FR4 or FR5 in the electronics industry, are used for a mounting plate embodied in the form of a printed circuit board.

In another embodiment of the invention, the printed circuit board has a ring of solder arranged circumferentially around the opening on a surface oriented toward the sensor element. The solder ring makes it possible to circumferentially seal an element to be soldered in place and is situated concentric to the opening and embodied in the form of an optional solder-coated ring, for example. The solder ring can also have a contour that deviates from the circular form, for example a rectangle contour, in order to assure an advantageous adaptation to the cross section of the opening and/or to a geometry of the component to be soldered in place.

In another embodiment of the invention, the sensor element is soldered to the solder ring. To this end, the sensor element has a metallic end surface that corresponds to the geometry of the solder ring and permits a direct, integral attachment between the solder ring and the sensor element. This makes it possible to advantageously produce a sealed connection between the sensor element and the printed circuit board. Alternatively or in addition to this, it is also possible to provide an adhesive connection between the sensor element and the printed circuit board.

In another embodiment of the invention, the solder ring has an aperture ring soldered onto it, which has a through bore whose diameter is smaller, in particular at least 2 times smaller, than a diameter of the opening. The purpose of the aperture ring, which can be embodied in the form of a metal ring or a metallized plastic ring, is to provide an additional sealing action between the filter device and the sensor element. This sealing action is achieved in that the end surface of the filter element rests against a preferably annular surface of the aperture ring and is thus attached communicatively to the sensor device only in the region of the through bore provided in the aperture ring, while the remaining end surface of the filter device functions as a sealing surface.

In another embodiment of the invention, the opening is embodied in the form of a stepped bore in the mounting plate. A stepped bore has at least two different diameters. The stepped bore is preferably let into the mounting plate so that a larger diameter is provided on the side of the mounting plate oriented toward the sensor element while a smaller diameter is provided on the side of the mounting plate oriented away from the sensor element. As a result, an undercut is provided for the filter device, into which the end region of the compressed filter device can expand after passing through the preceding narrower cross section. This also makes it possible to achieve an advantageous mechanical locking for the filter device as well as an additional sealing action similar to the kind achieved in a labyrinth seal. Other bore shapes can alternatively be provided, e.g. a bore in the shape of a segment of a cone, with an undercut step. Of decisive importance is the fact that the opening in the mounting plate compresses the filter device in such a way that it is possible to assure both a sealing action between the mounting plate and the filter device and a communicative connection between the sensor element and a region surrounding the fluid sensor.

In another embodiment of the invention, the opening has a galvanically applied circumferential sealing lip. A galvanically applied circumferential sealing lip can be provided during the manufacture of a printed circuit board in which a galvanic layer is produced anyway. For example, an arbitrarily shaped opening in the printed circuit board can be produced, for example by means of drilling, laser cutting, water jet cutting, or punching. On one side of the printed circuit board, the edge of the opening is bordered by a metallic layer that serves as an electrode for a galvanic coating process. After the galvanic coating is produced, a circumferential metallic bead protruding inward is formed at the edge of the opening. This bead narrows the cross section of the opening in some areas and forms an undercut for the form-locked accommodation of the filter device.

In another embodiment of the invention, the sensor element, the mounting plate, and the filter device can be, at least essentially, completely encapsulated in a dimensionally stable casting material. The casting material, for which in particular a castable, hardenable plastic resin material is selected, serves to encapsulate the sensor element, mounting plate, filter device, and possibly other components of the fluid sensor in a dimensionally stable way. In this instance, in order to be able to assure a communicative connection between the sensor element and the region surrounding the fluid sensor, the casting material does not wet the filter device on an end surface oriented away from the mounting plate.

In another embodiment of the invention, the sensor element can be embodied in the form of a pressure sensor, in particular for determining a gas pressure. The fluid sensor according to the invention can therefore be used to produce a tire pressure sensor, for example.

In another embodiment of the invention, the sensor element can be associated with at least one integrated circuit for evaluating sensor signals. The integrated circuit amplifies the sensor signals generated by the sensor element and carries out an evaluation in order to be able to transmit a measurement value determined by the sensor device to a data bus system in a motor vehicle. For example, the measurement value determined can be displayed on a display instrument of the motor vehicle.

In another embodiment of the invention, the integrated circuit can be equipped to wirelessly couple in supply energy and to wirelessly couple out at least one sensor signal. The spaced-apart interface provides a supply energy, particularly in the form of electromagnetic waves, and receives a signal, which is transmitted by the fluid sensor and contains the measurement value or values. This makes it possible to achieve a simply designed embodiment for a fluid sensor that is supported so that it can move in relation to the interface. This is of particular interest when the fluid sensor is used as a tire pressure sensor; in this case, the fluid sensor is mounted in the rotatably supported wheel of the motor vehicle, while the interface can be mounted in a wheel well in the vicinity of the fluid sensor, for example so that it is stationary in relation to the chassis, and permits a wireless transmission of energy and signals.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus, are not limitive of the present invention, and wherein:

FIG. 1 is a top view of a fluid sensor;

FIG. 2 is a sectional view of the fluid sensor shown in FIG. 1, extending along the line A-A; and FIG. 3 shows another embodiment of a fluid sensor in a sectional view extending along the line A-A.

DETAILED DESCRIPTION

In the fluid sensor 10 according to the invention depicted in a perspective top view in FIG. 1, an electronic sensor element embodied in the form of a pressure sensor 12 is shown. The pressure sensor 12 is attached to a mounting plate embodied in the form of a board 14 or printed circuit; an active surface of it, which is embodied as a pressure sensing membrane 28, is oriented toward the surface of the printed circuit board 14. In this instance, a gas filter 20 that is manufactured out of an elastically deformable material is inserted into an opening formed in the printed circuit board. The fact that the opening formed in the printed circuit board has a smaller diameter than the gas filter 20 produces a sealing action between the printed circuit board opening and the gas filter 20. The gas filter 20 in this case is inserted into the printed circuit board by means of a joining process, preferably by means of being plugged into it. This makes it possible to manufacture a reliable, gas-tight connection without an adhesive connection and permits achievement of a significant reduction in the manufacturing costs of mass production.

The fluid sensor 10 depicted in FIG. 2 is provided for determining a gas pressure and to this end, has an electronic sensor element embodied in the form of a pressure sensor 12. The pressure sensor 12 is attached to a mounting plate embodied in the form of a board 14 or printed circuit; an active surface of it, which is embodied in the form of a pressure sensing membrane 28, is oriented toward the surface of printed circuit board 14.

Between the printed circuit board 14 and the pressure sensor 12, an aperture ring 16 is provided. The aperture ring 16 is soldered in a gas-tight fashion to a solder ring not shown in detail; the solder ring is embodied as a structure of a copper-cladding provided on the printed circuit board 14. The printed circuit board is provided with an opening embodied in the form of a stepped bore 18. The solder ring is provided circumferential to the circular stepped bore 18 so that the aperture ring 16 is aligned at least essentially concentric to the stepped bore 18. On an end surface, the pressure sensor 12 is glued to the aperture ring 16 in a gas-tight fashion.

A gas filter 20 manufactured out of an open-pored polytetrafluoroethylene is accommodated as a filter device in the stepped bore 18. The schematically depicted stepped bore 18 constitutes an undercut for the gas filter 20 since the diameter of the opening narrows for part of the way and then widens out again. In the narrowed region of the stepped bore 18, the gas filter 20 is elastically compressed so that within a predeterminable pressure range, it assures a sealed connection in relation to the printed circuit board 14. This prevents gas from being able to flow past the gas filter 20 at the side, bypassing it and leading to a contamination of the pressure sensor 12. The stepped bore 18 consequently assures a communicative connection of the pressure sensor 12 to the gas filter 20 and therefore also to the region surrounding the fluid sensor 10. A typical diameter for a gas filter 20 lies in a range between 1 mm and 5 mm. A typical thickness for the printed circuit board 14 lies in a range between 0.3 mm and 2 mm.

The gas filter 20 is accommodated in the stepped bore 18 of the printed circuit board 14 in such a way that it protrudes slightly beyond the surface of the printed circuit board 14 oriented toward the pressure sensor 12 and rests with its end surface flat against the aperture ring 16. In order to accommodate the cylindrical gas filter 20, the aperture ring 16 has a circular recess so that the gas filter 20 and the aperture ring 16 cooperate to produce a sort of labyrinth seal in order to achieve an advantageous sealing action. The through bore 30 provided in the aperture ring 16 has a diameter of that is significantly smaller than the diameter of the gas filter 20 in order to assure that the gas filter 20 contacts the aperture ring 16 over a large area.

The printed circuit board 14 is also provided with an integrated circuit embodied in the form of a semiconductor component 22 that is used to evaluate signals of the pressure sensor 12. The semiconductor component 22 also permits supply energy to be coupled in wirelessly and permits the sensor signal to be coupled out wirelessly at an interface that is not depicted. The semiconductor component 22 is accommodated in a housing 24 whose underside is provided with contact surfaces, not shown in detail, for a solder connection to the printed circuit board 14. On a projection that protrudes out from the side of the housing 24, a plurality of bond pads are provided, which permit an electrical coupling of the semiconductor component 22 to the pressure sensor 12 via bonding wires 26.

The printed circuit board 14, the semiconductor component 22, the pressure sensor 14, and the gas filter 20 are encapsulated almost completely by a dimensionally stable plastic material for protecting the fluid sensor 10 from environmental influences. Only the gas filter 20 penetrates the plastic material at its end, in order to be able to assure a communicative connection of the pressure sensor 12 with the region surrounding the fluid sensor 10. Electrically conductive contact surfaces are not provided on the outer surface of the plastic material because a coupling-in of the supply energy and a coupling-out of the sensor signal occur in an exclusively wireless fashion in the embodiment depicted. In an embodiment of a fluid sensor that is not shown, it is possible to provide electrically conducting contact surfaces that reach the outside and are embodied for coupling in test signals or for a wired operation of the fluid sensor.

By means of a sectional view along the line A-A, FIG. 3 shows another embodiment of a pressure sensor module according to the invention. In this instance, provided that nothing to the contrary is described below, the embodiment shown corresponds to the embodiment of the device that has been described above in conjunction with the drawing components shown in FIG. 2. As a modification to the embodiment described above, in lieu of the stepped bore, a bore 19 is provided that has a bevel in the form of a segment of a cone. One advantage of this embodiment is that as a result, along the conically narrowing bore 19, a large sealing surface is created between the pressure sensor 20, which elastically deforms in the joining process, particularly upon insertion into the receiving bore 19. This achieves a particularly reliable sealing action. In addition, the pressure sensor 20 can be easily inserted and is reliably attached permanently to the pressure sensor 12 without additional fastening means such as gluing.

In another embodiment of the invention that is not shown, the stepped bore has only one step so that a larger diameter of the stepped bore borders the aperture ring while a smaller diameter of the stepped bore is oriented away from the pressure sensor. This makes it possible to achieve a particularly simple manufacture of an undercut opening for the gas filter in the printed circuit board.

What is claimed is:

1. A fluid sensor for determining a fluid characteristic, the fluid sensor comprising:
    an electronic sensor element that has an active surface for determining the fluid characteristic;
    a mounting plate associated with the sensor element; and
    a filter device associated with the sensor element for filtering a fluid, the filter device having an end region,
    wherein the active surface of the sensor element is oriented toward the mounting plate and the mounting plate is provided with an opening opposite from the active surface of the sensor element,
    wherein the filter device has an elastically compressible end region and the opening has a cross section that is smaller than the end region of the filter device, and
    wherein the filter device is accommodated in a sealed fashion in the opening of the mounting plate such that the end region of the filter device is elastically deformed in some regions by an elastic deformation that occurs in the joining process.

2. The fluid sensor according to claim 1, wherein the mounting plate is a printed circuit board that is provided for coupling electrical signals into and/or out of the sensor element.

3. The fluid sensor according to claim 2, wherein, on a surface oriented toward the sensor element, the mounting plate has a solder ring situated circumferentially around the opening.

4. The fluid sensor according to claim 3, wherein the sensor element is soldered to the solder ring.

5. The fluid sensor according to claim 3, wherein the solder ring has an aperture ring soldered onto it, which has a through bore whose diameter is smaller, in particular at least 2 times smaller, than a diameter of the opening.

6. The fluid sensor according to claim 1, wherein the opening is in the form of a stepped bore in the mounting plate.

7. The fluid sensor according to claim 1, wherein the opening has a galvanically applied circumferential sealing lip.

8. The fluid sensor according to claim 1, wherein the sensor element, the mounting plate, and the filter device are completely encapsulated in a dimensionally stable casting material.

9. The fluid sensor according to claim 1, wherein the sensor element is a pressure sensor for determining a gas pressure.

10. The fluid sensor according to claim 1, wherein the sensor element is associated with at least one integrated circuit for evaluating sensor signals.

11. The fluid sensor according to claim 1, wherein the integrated circuit wirelessly couples in supply energy and wirelessly couples out at least one sensor signal.

* * * * *